US005918960A

United States Patent [19]

Hopwood et al.

[11] Patent Number: 5,918,960

[45] Date of Patent: Jul. 6, 1999

[54] DETECTION OF COUNTERFEIT OBJECTS, FOR INSTANCE COUNTERFEIT BANKNOTES

[75] Inventors: John Geoffrey Hopwood, Salford; Lydia J. Baron, Bushey Heath; Linda J. Tenenbaum, London; Stephen Paul Raphael, Wokingham; Philip Robert Skipper, Oeverton, all of United Kingdom

[73] Assignee: Mars Incorporated, McLean, Va.

[21] Appl. No.: 08/674,349

[22] Filed: Jul. 2, 1996

Related U.S. Application Data

[63] Continuation-in-part of application No. PCT/GB95/00022, Jan. 4, 1995, and application No. 08/481,372, Jul. 7, 1995, abandoned.

[51] Int. Cl.[6] .......... G06K 9/00

[52] U.S. Cl. .......... 350/71

[58] Field of Search .......... 356/71

[56] References Cited

U.S. PATENT DOCUMENTS

| | | | |
|---|---|---|---|
| 2,646,717 | 7/1953 | Selgin . | |
| 3,628,016 | 12/1971 | Berler . | |
| 3,842,281 | 10/1974 | Goodrich . | |
| 4,019,819 | 4/1977 | Lodzinski . | |
| 4,114,804 | 9/1978 | Jones et al. . | |
| 4,146,792 | 3/1979 | Stenzel et al. . | |
| 4,147,430 | 4/1979 | Gorgone et al. | 356/71 |
| 4,183,665 | 1/1980 | Iannadrea et al. . | |
| 4,275,299 | 6/1981 | Favre . | |
| 4,296,326 | 10/1981 | Haslop et al. | 356/71 |
| 4,526,466 | 7/1985 | Sandercock . | |
| 4,558,224 | 12/1985 | Gober . | |
| 4,588,224 | 5/1986 | Hill, Jr. . | |
| 4,634,872 | 1/1987 | Janus et al. . | |
| 5,304,813 | 4/1994 | De Man . | |
| 5,308,992 | 5/1994 | Crane et al. . | |

FOREIGN PATENT DOCUMENTS

| | | |
|---|---|---|
| 0 083 062 | 7/1983 | European Pat. Off. . |
| 0 121 272 | 10/1984 | European Pat. Off. . |
| 0 257 749 | 3/1988 | European Pat. Off. . |
| 0 314 312 | 5/1989 | European Pat. Off. . |
| 0 366 306 | 5/1990 | European Pat. Off. . |
| 0 424 342 | 4/1991 | European Pat. Off. . |
| 0 466 119 | 1/1992 | European Pat. Off. . |
| 0 537 431 | 4/1993 | European Pat. Off. . |
| 0 543 058 | 5/1993 | European Pat. Off. . |
| 2 382 060 | 10/1978 | France . |
| 2 470 416 | 6/1981 | France . |
| 2 593 840 | 8/1987 | France . |
| 2 319 149 | 4/1973 | Germany . |
| 1 326 665 | 8/1973 | United Kingdom . |
| 2 018 984 | 10/1979 | United Kingdom . |
| 2 029 009 | 3/1980 | United Kingdom . |
| 2 047 402 | 11/1980 | United Kingdom . |
| 2 146 823 | 4/1985 | United Kingdom . |
| WO 87/07415 | 12/1987 | WIPO . |
| WO 89/00319 | 1/1989 | WIPO . |
| WO 90/07165 | 6/1990 | WIPO . |
| WO 94/16412 | 7/1994 | WIPO . |

*Primary Examiner*—Richard A. Rosenberger
*Attorney, Agent, or Firm*—Fish & Richardson P.C.

[57] ABSTRACT

Detecting counterfeit banknotes is achieved by directing ultraviolet light at a sample from a source (104) and measuring the level of ultraviolet light reflected from the sample using a first photocell (104) and the amount of fluorescent light generated by the sample using a second photocell (106). The detected levels are compared with reference levels and only if both reflective and fluorescent criteria are satisfied is the note declared genuine. The sample, during test, is swiped over a glass window (102), preferably under an overlying shield.

55 Claims, 8 Drawing Sheets

DETECTION OF COUNTERFEIT OBJECTS, FOR INSTANCE COUNTERFEIT BANKNOTES

CROSS REFERENCE TO RELATED APPLICATIONS

This application is a continuation-in-part of copending International Application No. PCT/GB95/00022, filed Jan. 4, 1995, which designated the United States and which claimed the benefit of International Application No. PCT/GB94/00006. This application is also a continuation-in-part of U.S. Ser. No. 08/481,372, filed Jul. 7, 1995, now abandoned based on International Application No. PCT/GB94/00006.

BACKGROUND OF THE INVENTION

This invention relates to the detection of counterfeit objects. The invention will be described primarily in the context of the detection of counterfeit banknotes, but all aspects of the invention are applicable also to other documents, such as passports, cheques and trading stamps.

The production of counterfeit banknotes is continually increasing as a result of continuing improvements in printing technology, particularly colour printing. Counterfeit notes are now being made which appear, to the unaided eye, virtually indistinguishable from a genuine note.

It would be desirable to provide a device to assist a person conducting cash transactions, such as a shop assistant or bank teller, in verifying the authenticity of a received banknote. Such devices exist, but they rely for their operation on the experience and judgement of the user, and in any event are not very reliable. There are banknote discriminators which make numerous precise measurements to determine both authenticity and denomination of a banknote, but although these can be reliable, they are expensive, bulky and not suitable for use in, e.g., a shop where a customer's banknotes would have to be fully inserted into the machine before verification. The present invention seeks to provide a device which solves these problems, preferably by providing apparatus which can reliably be used to verify authenticity of banknotes held by a user without requiring accurate positioning and measuring techniques. However, the invention is applicable also to automatic discrimination devices, such as those in which the notes are fully inserted into a machine to enable measurements to be made.

Genuine monetary notes are now generally made to a specific formulation such as security or unbleached paper. Counterfeit notes, on the other hand, are generally but not always made from bleached paper. It is known to differentiate bleached from unbleached paper by viewing the paper under a source of ultraviolet radiation, such as an ultraviolet (UV) lamp which emits light having a wavelength which peaks in a band of from 300 to 400 nm.

Bleached paper includes chemical components which fluoresce when exposed to ultraviolet radiation; that is, the molecules in the composition of the paper are excited and emit light at a longer wavelength which peaks in the band of from 400 to 500 nm. Because wavelengths of 300 to 400 nm generally lie outside the spectral region of the human eye and because wavelengths of from 400 to 500 nm lie within the spectral region, the phenomena of fluorescence allows some counterfeits to be detected with the human eye.

This process can be automated with the use of electronics by providing a sensor and a comparator which compares the intensity of the fluorescent light sensed with a reference level so as to provide an indication as to whether the paper is a likely counterfeit or not. Such an apparatus is disclosed in U.S. Pat. No. 4,558,224. However, some genuine money notes if washed acquire a deposit of chemicals which fluoresce and some counterfeit notes are made with paper containing little or no fluorescent materials and so the fluorescing phenomenon is not always an infallible way of deciding whether a note is counterfeit or not.

SUMMARY OF THE INVENTION

It is an object of this invention to provide an improved method and apparatus of detecting counterfeit objects.

According to one aspect of the present invention there is provided apparatus for detecting counterfeit objects comprising means for illuminating the object with light within a first wavelength band, a detector for detecting light from said object having a first wavelength within said first wavelength band and a second wavelength within a second wavelength band different from said first wavelength band and said second wavelength band including wavelengths at which counterfeit objects may fluoresce when exposed to light in said first wavelength band, comparison means for comparing the output of the detector with at least one reference level and decision means for deciding, based on said comparison whether said object is counterfeit or not and providing an appropriate indication.

According to another aspect of the present invention there is provided apparatus for detecting counterfeit objects comprising a detector for providing a first signal indicative of the reflectivity of an object within a first wavelength band and a second indicative of the fluorescence of the object within a second wavelength band different from said first wavelength band and decision means for deciding, based on said first and second signals, whether said object is a genuine banknote and for providing an appropriate indication.

Various further aspects of the invention are set out in the accompanying claims.

It has been discovered that genuine and counterfeit banknotes often have different reflectivities particularly when exposed to ultraviolet radiation in the band of from 300 to 400 nm. It has also been discovered, somewhat surprisingly, that when the reflectivities of genuine and counterfeit notes are similar, the fluorescence exhibited by the notes is usually dissimilar, and vice versa. Thus by applying two tests to sense both the fluorescent light and the reflected light from a banknote exposed to ultraviolet radiation, a banknote can be declared genuine or counterfeit with great certainty.

The use of these techniques provides a surprisingly quick and effective way of detecting counterfeits. It has been found that no other measurements are needed, and consequently it is preferred that the indication of genuineness is given in response to measurements related only to reflectivity and fluorescence. Preferably, authentication is carried out on the basis of a single reflectivity value and a single fluorescence value, which are related to the whole object or a large area thereof. This, and the fact that discrimination between different denominations is unnecessary in a device intended for manual use by the banknote recipient, avoids the need for precise positioning of the banknote. However, the invention is applicable to other arrangements also; for example the technique may be used to supplement further measurements made in an otherwise-conventional banknote validator.

Although reference is made herein to reflectivity measurements, it is believed that transmissivity could be measured instead or in addition thereto.

The techniques enable the construction of a simple counterfeit detector which is easy to use, e.g. beside a cash till.

Preferred aspects of the invention are directed to enhancing the usability of the apparatus. Although these will be described in the context of an apparatus which employs the techniques mentioned above, they are considered independently inventive and could be applied to apparatus which does not employ such techniques.

According to a further aspect of the invention, apparatus for detecting counterfeit banknotes comprises a housing having a first part containing a radiation source and provided with a window enabling a sheet to be illuminated by the source, sensor means (preferably within said first part) responsive to radiation from the illuminated sheet for enabling a test to be performed to determine whether the sheet is a genuine banknote, and a shield overlying the window for reducing the amount of ambient light received by the sensor means.

The shield is preferably arranged so that a sheet can be held by the user of the apparatus, inserted between the shield and the window and then withdrawn therefrom without being released. If used by a shop assistant at the cash till, this would give greater confidence to the customer as the note is always seen to be visible and held while the testing operation is carried out. The gap between the window and the shield is therefore preferably open on at least two adjacent sides, and preferably on three adjacent sides so that the user can swipe the banknote into the gap via one side and out of the gap via the opposite side.

The gap between the shield and the window is preferably narrow (e.g. from 0.5 to 25 mm and preferably from 1 to 5 mm) to reduce the effect of ambient light, and preferably widens at least along one side of the shield to facilitate insertion. The widened opening may be for example at least 10, or possibly at least 60 mm.

Preferably, the arrival of the note is automatically sensed so as to actuate the decision means. This automatic sensing could be achieved using one or more of the sensor or sensors used for the testing operation, or alternatively a separate arrival sensor could be provided.

Preferably, the machine is operable to give a first positive indication if the note is tested and found to be genuine, and a different positive indication if the note is tested and found to be counterfeit, so that the user knows when the test is finished. There is preferably also a third indication state, which is given when the apparatus is ready to receive and test a further note.

Use of these techniques enables the construction of a counterfeit detection apparatus which is simple, easy to use and relatively rapid in operation, enabling quick insertion of successive banknotes after each testing operation, which is reliable and which can be used while maintaining customer confidence.

BRIEF DESCRIPTION OF THE DRAWINGS

Counterfeit detection apparatus embodying the invention will now be described, by way of example, with reference to the accompanying diagrammatic drawings, in which:

FIG. 1 shows apparatus for irradiating a banknote with light and then measuring the amount of fluorescent light and reflected light.

DESCRIPTION OF THE PREFERRED EMBODIMENTS

Figure 1:
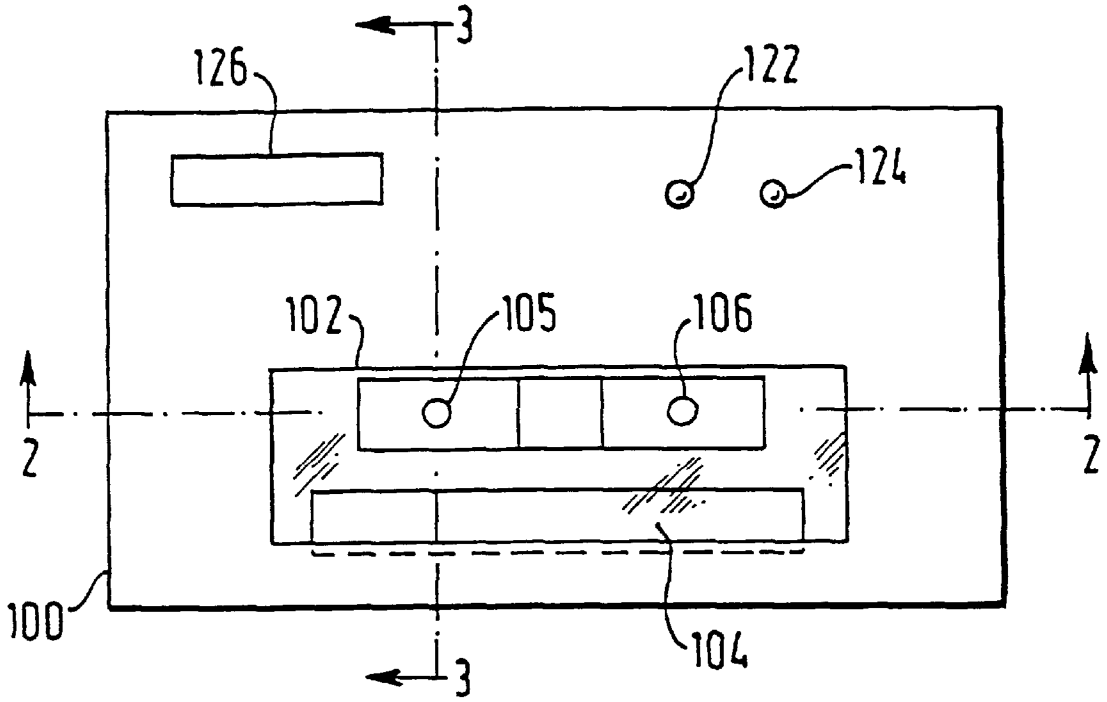
FIG. 1 is a plan view of a first embodiment of the invention.
Figure 2:
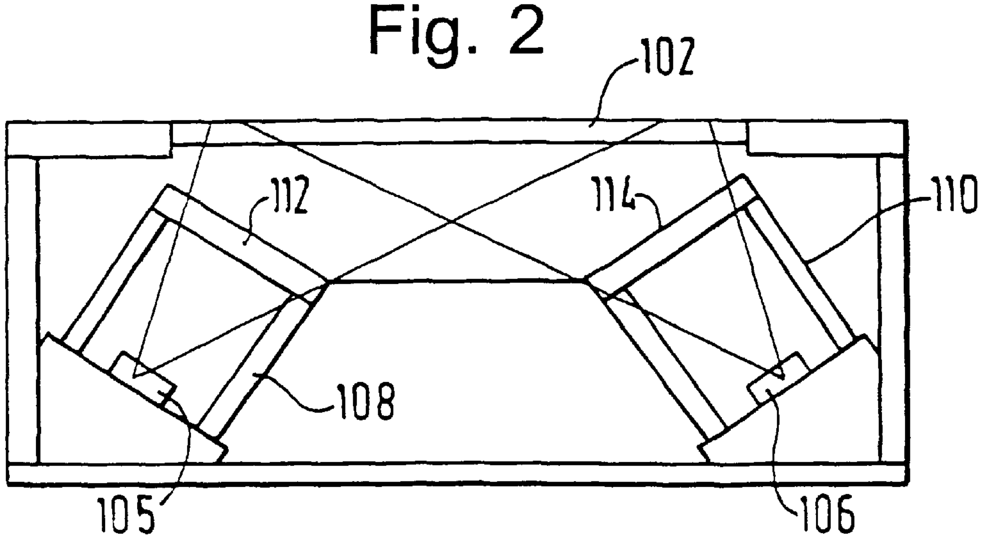
FIG. 2 is a section taken on line 2—2 of FIG. 1.
Figure 3:
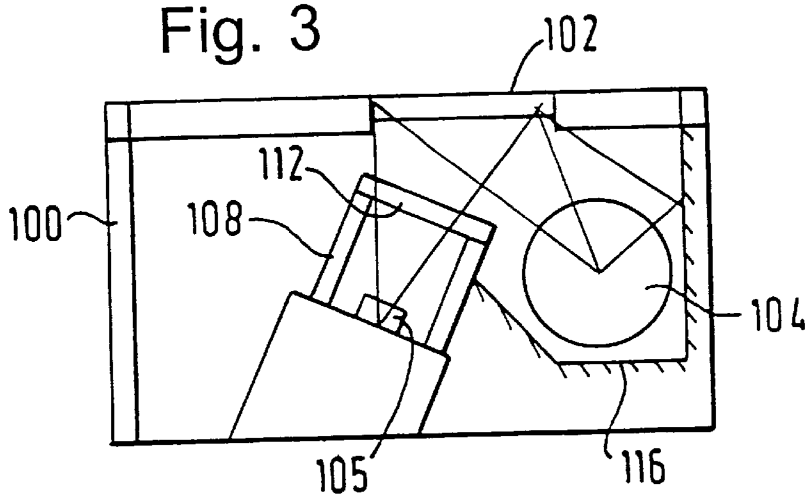
FIG. 3 is a section taken on line 3—3 of FIG. 1.

As shown the apparatus includes a generally rectangular container 100 having a window 102 against which a banknote to be sensed can be placed. Within the container 100 there is provided an elongate light source 104 for producing light in the 365 nm region and directing it through the window 102. Also within the container are two photo-diodes 105 and 106 spaced apart from one another but angularly inclined so that their optical axes intersect generally at the outer surface of the window 102. Each photo-diode 105 and 106 is mounted on the floor of a respective tubular opaque housing 108 and 110. The inner walls of the housing are lined with reflective material to increase the sensitivity of the photo-diodes. A 365 nm band pass optical filter 112 covers the housing 108 and a 450 nm band pass optical filter covers the housing 110. The bandwidth of the filters is such that they do not overlap.

The lamp 104 is surrounded on three sides by reflective material 116, for example aluminium foil, which reflects light generally in the direction of the window 102 to concentrate the light at the window.

Preferably the reflective material is so positioned around the light source that the optical plane of the light directed at the window makes the same angle with the window as do the optical axes of the photo-detectors in a manner to ensure that the photo-detectors receive the maximum fluorescent and maximum reflected light from any banknote placed on the window 102. Although it is preferred that at least the photosensor for the reflected light receive light from the source which has been specularly reflected, this is not essential.

The window 102 is provided by a glass plate which reflects some of the light received from the source 104 back to the photo-diode 105. The light is principally reflected back from the glass-air boundary of the plate and typically is around 8% of the light directed at the glass plate.

When a genuine banknote is placed on the window the amount of reflected light at 365 nm is usually fairly small and so typically the amount of reflected light will increase from 8% to a value in the range of from 12 to 18%. Thus it will be seen that the light reflected from the plate when no banknote is present can be used as a reference level to compare the degree of reflection with when a banknote is present.

Thus any diminution in light output from the lamp due to ageing or any other defect is automatically compensated. Other errors are also eliminated because the light paths and components used to determine the reference level are the same as the light paths and components used to effect a measurement.

In the case of fluorescence the amount of fluorescent light emitted by a counterfeit banknote is generally several orders higher than the amount of light emitted by a genuine banknote and so any degradation of the light source 104 makes little or no difference to the detection of fluorescent light. Nevertheless, it has been found that improved operation may be obtained by using the detected fluorescence when no banknote is present as a reference level.

An electronic processor (not shown but which will be described in more detail hereinafter) monitors the light received by both photocells with the lamp 104 switched on. In the absence of a banknote on a window the photocell 105 will provide a steady state output. As soon as a banknote is placed on the window the output from the photocell 105 will rise and a trigger signal is then generated to activate two measurement circuits for measuring the outputs of the two photocells 105 and 106.

The measurement circuits provide readings which can be displayed by a display device 126, and a decision circuit will, in response to the readings, activate one of two optical indicators 122 and 124 respectively indicating that the banknote is genuine or counterfeit.

A printer (not shown) may be provided to record the values displayed by the display device 126.

It will thus be seen that the apparatus is automatically activated by the placement of a banknote on the window to determine whether the banknote is genuine or counterfeit.

Figure 4:
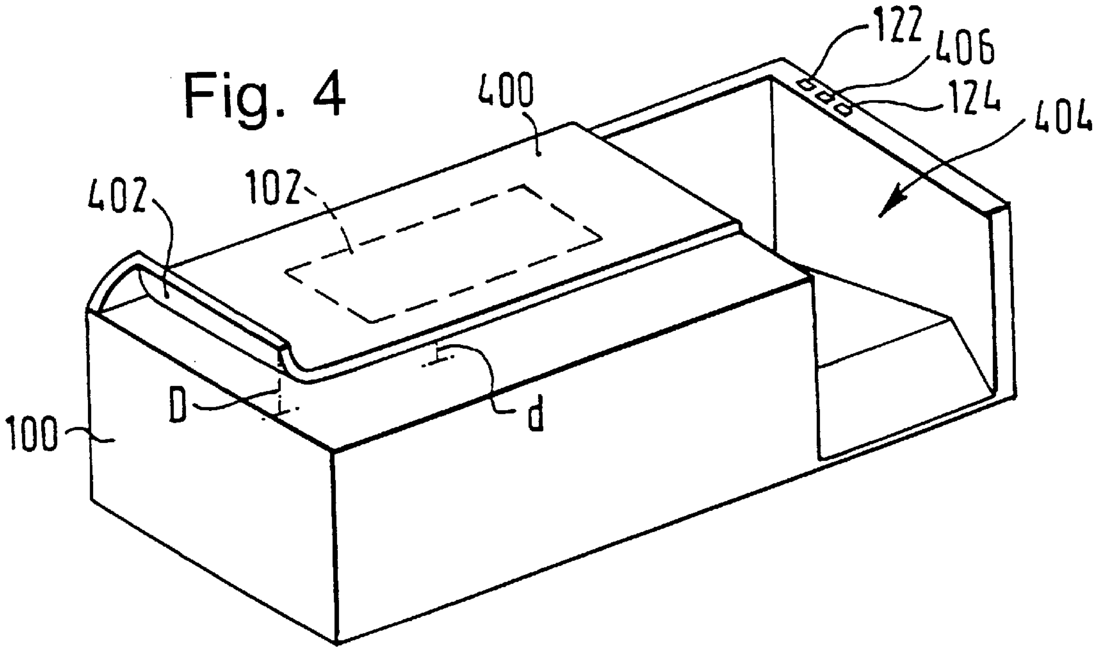
FIG. 4 is a perspective view of a second embodiment.
Figure 5:
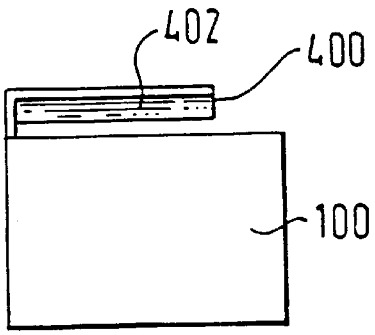
FIG. 5 is an end view of the FIG. 4 embodiment.

FIGS. 4 and 5 show another embodiment, wherein like reference numbers indicate like elements. It is to be noted that any features described with reference to the first embodiment may be applied to this second embodiment and vice versa.

The embodiment of FIGS. 4 and 5 has a shield 400 located over the window 102 formed in the housing 100 which represents a base part of the structure. The shield 400 is spaced from the window 102 by a small distance d of, e.g. 0.5 to 5 mm. As can be seen from FIG. 5, the left, right and frort sides of the shield 400 are open so that a user gripping a banknote can swipe it through the space between the shield 400 and window 102 from the left to the right side of the shield 400 without letting go. The left edge 402 of the shield 400 is curved upwardly to provide a widened entrance to the gap to facilitate insertion. The entrance gap D is preferably at least several times greater than the gap d, and may for example be 10 to 60 mm.

The housing 100 has a receptacle part 404 adjacent the right side of the shield 400 for receiving banknotes after they have been swiped past the window 102. There is a third indicator 406 which is illuminated when the apparatus is ready to receive and test a banknote. The indicators 122, 124 and 406 thus form an indication means having four indication states, and the apparatus may be operated as follows. When a shop assistant is handed a stack of bills, she passes them one by one through the gap between the shield and the window, each time waiting for the indicator 406 to be illuminated (indication state A). The indicator 406 ceases to be illuminated (state B) when the bill is detected. The indicator 122 is illuminated (state C) after successful testing and the bill withdrawn and placed in the receptacle 404. The next bill is then tested. If any bill is counterfeit, the indicator 124 is instead illuminated (state D).

Figure 6:
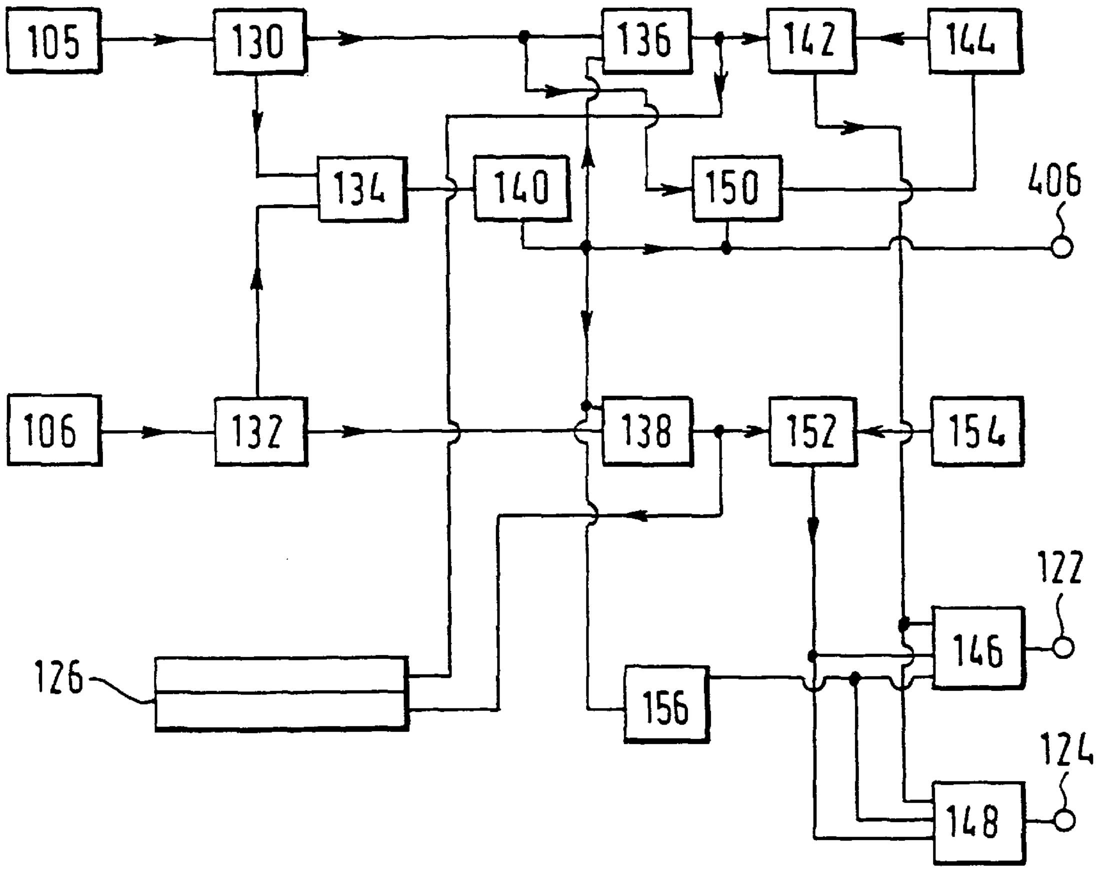
FIG. 6 is a block diagram of circuitry which can be used in the apparatus of FIG. 1 or that of FIG. 4.

The block diagram of FIG. 6 shows the processor in more detail. The photocells as represented by the blocks 105 and 106 preferably include built-in amplifiers. Each feeds a respective trigger circuit 130 and 132 for detecting a rapid change in signal for example as a result of a banknote being placed on the window. Either or both trigger circuits 130 and 132 feed a signal to a gate 134 which, via actuator 140, actuates two measurement circuits 136 and 138 (for example by supplying power to them or deactivating inhibitors which inhibit their operation) and deactuates the indicator 406 (if present). A delay circuit in the actuator 140 deactuates the measurement circuits 136 and 138 after a short measurement period. A first comparator 142 compares the output of the photocell 105 with a reference value stored in a store 144 and an output dependent on the relationship between the detected value and the reference value is generated and is fed simultaneously to logic circuits 146 and 148. The signal stored in the store 144 is derived from the photocell 105 during the quiescent state of the apparatus. The output of the photocell 105 is amplified by an amplifier 150 by a factor of between 25% and 50% and stored in the store 144. As soon as the actuator 140 is triggered, the amplifier 150 is inhibited so that the store 144 only stores the quiescent value of reflected light. (In practice a delay circuit or similar may be provided so the quiescent value in the store 144 is not influenced by the increased output which triggers actuator 140.) A comparator 152 compares the output of the measurement circuit 138 with a reference value 154 and generates an output signal dependent on the relationship therebetween which is fed to the two logic circuits 146 and 148.

The logic gates 146 and 148 are enabled by the actuator 140 (via a delay circuit 156 to allow time for the measurements to stabilise). The logic circuit 146 responds when a genuine note is detected to energise the indicator 122. Similarly the logic circuit 148 responds to energise the indicator 124 when a counterfeit note is detected. Relative to the dynamic ranges of the sensor circuits, it is expected that a genuine banknote will produce relatively low responses from both photosensors. Accordingly, if the comparators 142 and 152 compare their inputs with a simple threshold, the logic gate 146 may be arranged to produce an output only if each input indicates that the respective threshold has not been exceeded, and the logic gate 148 can produce an output in other circumstances.

Preferably, however, one or both of the comparators 142 and 152 is/are arranged to compare its input with upper and lower thresholds defining a window around a reference level and to produce one output if the input is between the thresholds and a different output otherwise. Thus, the apparatus may be arranged to determine a banknote to be genuine only if a (probably relatively low) level of fluorescence is detected and only if a (relatively low) reflectivity is detected.

The actual values at the outputs of the two measured circuits 136 and 138 are fed to the display 126 (if present) for display thereby.

If it is required to make more precise measurement of the fluorescence signal then it can be normalised to the reference level in the same way as the reflectance signal. The associated reference level may thus be dependent on the detected quiescent fluorescence or on the detected quiescent UV radiation.

After the indicator 122 or 124 has been illuminated, and the trigger circuits sense that the note has been withdrawn, the actuator 140 causes the indicator 406 to be illuminated again.

It will be appreciated that the value of the reference signals stored in the stores 144 and 154 can be adjusted as required. This could be done at manufacture during a calibration stage, or means may be provided for user-adjustment. Switch means may be provided for altering the reference values to correspond with pre-stored references suitable for currencies of respective countries. If desired, the apparatus could be made self-calibrating by automatically adjusting one or more of the reference values so that they at least approximately track the actual measured values of notes determined to be genuine.

To reduce further the effect of ambient light the light source can be modulated at a selected frequency and the outputs of the photo diodes demodulated at the same frequency to eliminate the effects of ambient light.

The circuit of FIG. 6 can be used either with the first-described embodiment, in which case the indicator 406 is not required, or the second described embodiment, in which case the display 126 is not required.

The size of the area of banknote from which radiation is received by the sensors 105 and 106 (which corresponds substantially with the window size) is preferably large, e.g. at least 6 $cm^2$ and preferably at least 30 $cm^2$. Preferably, the size corresponds to at least 10% of the area of the notes to be tested. Sensing a large area of the banknote makes the measurements less dependent on positioning and alignment.

A third embodiment of the invention will now be described with reference to FIGS. 7 and 8, which show the structure of the embodiment, FIG. 9, which schematically illustrates a circuit of the embodiment, and FIGS. 10 and 11 which are flowcharts illustrating the operation of the embodiment. Any of the features of the structure, circuit or flowchart can be implemented in either of the embodiments described above; similarly, any of the features described above could be incorporated in the third embodiment.

Figure 7:
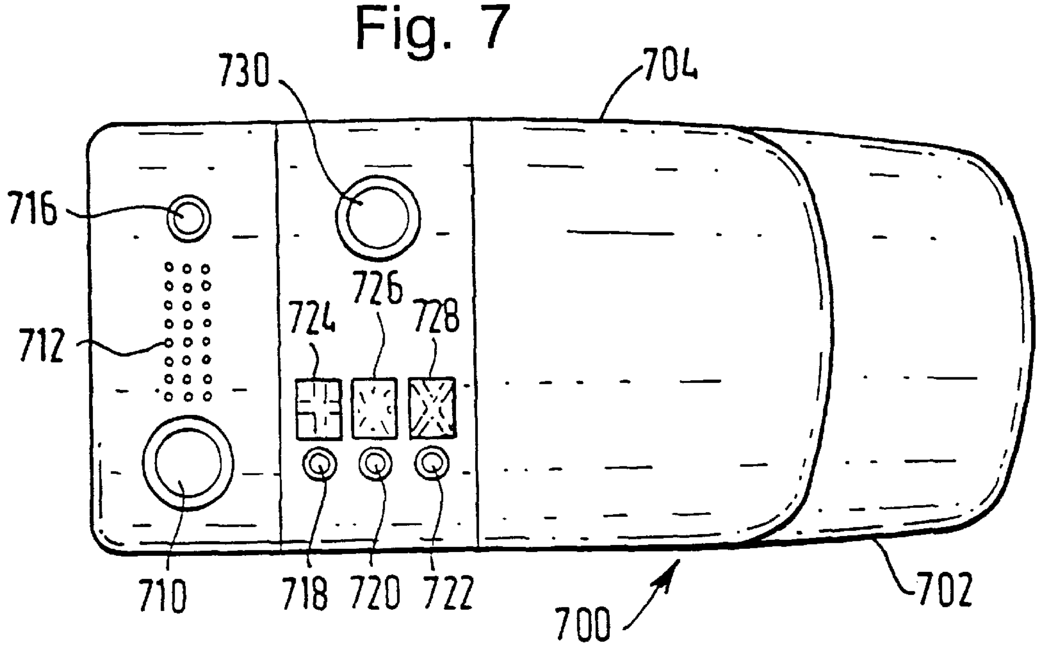
FIG. 7 is a plan view of a third embodiment.
Figure 8:
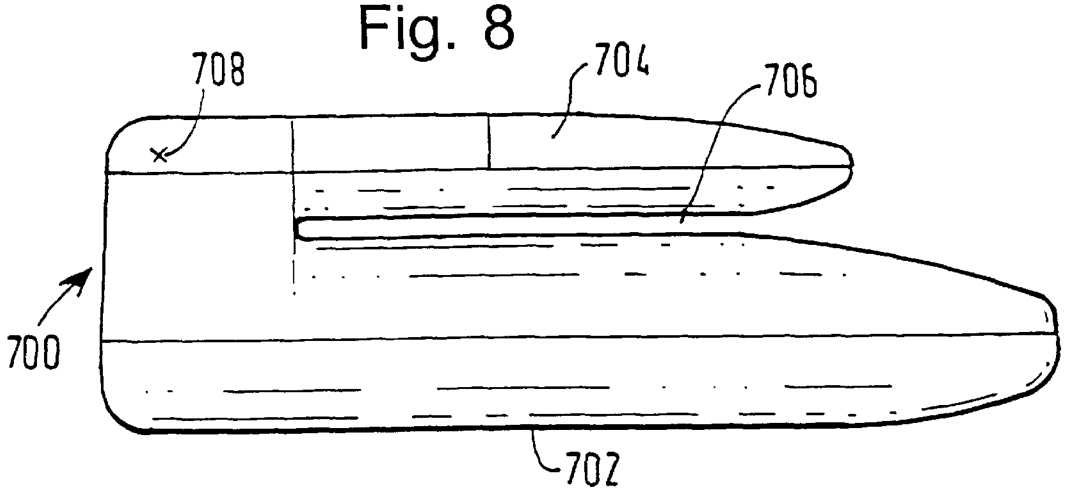
FIG. 8 is a side elevation of the third embodiment.

Referring to FIGS. 7 and 8, the embodiment has a housing 700 comprising a lower, base section 702 and an upper section 704. The upper section is supported at its rear (shown at the left in FIGS. 7 and 8) on the base section 702 in such a way that there is a gap 706 between the two sections, except for the region at the rear. As in the second embodiment, the gap is intended to permit a banknote to enter therein for checking its authenticity. For this purpose, the base section 702 is provided at its top with a window (not shown) to allow measurements to be made on a banknote in the slot 706. The slot has a small height, e.g. 1 mm, and the underside of the upper section 704 is non-reflective in the region of the window, so as to enhance the accuracy of the measurements. The window may for example be in the shape of a square, each side measuring approximately 40 mm.

A hidden hinge permits the upper section 704 to be pivoted upwardly about an axis shown at 708 to facilitate cleaning in the region of the slot.

On the upper surface of the upper section 704 there are a main display 710, which in this case is a bi-colour LED (i.e. it can be caused to display either a red or a green colour), holes 712 through which sounds from a speaker 714 (FIG. 9) with a built-in amplifier can pass, a pushbutton 716, which acts as a volume control (successive operations switch between off, low, medium and high volume modes), currency indicators comprising three LEDs 718, 720 and 722 adjacent which are respective indicia 724, 726 and 728, and a currency-selector button 730. In the second and third embodiments, the internal structure of the lower base unit, including the arrangement of the light source, reflectors, window and sensors, may correspond to that of the housing 100.

Figure 9:
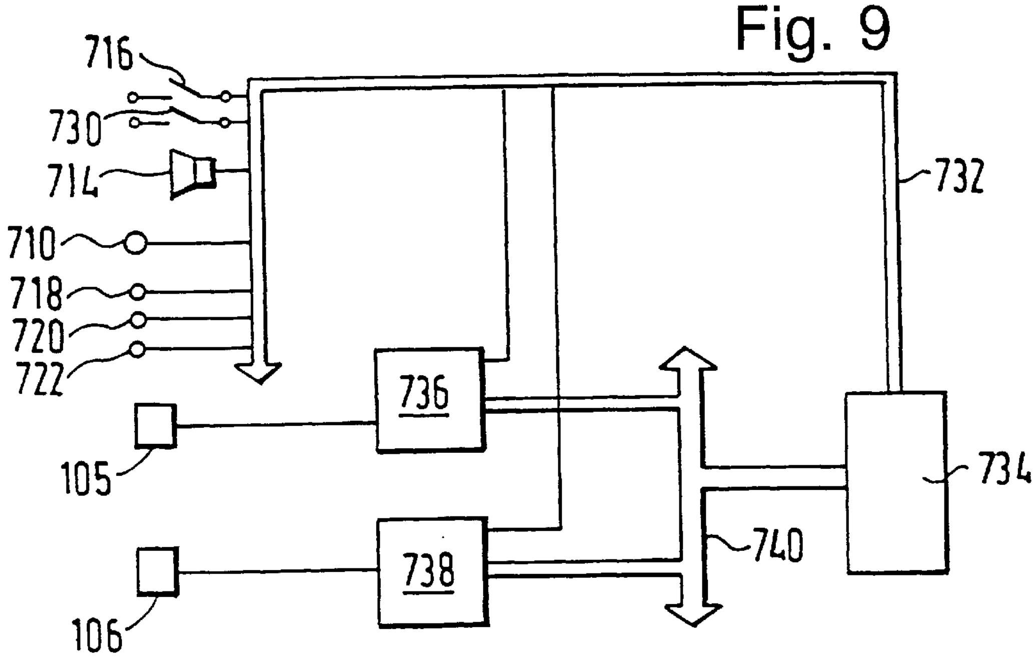
FIG. 9 is a schematic illustration of the circuitry of the third embodiment.

As shown in FIG. 9 (which illustrates only the relevant parts of the circuitry), these switches, LEDs and speaker are coupled via an input/output bus 732 to a controller formed by a microprocessor 734 which has internal ROM and RAM memories. The input/output bus is also connected to two control inputs of analog-to-digital converters 736 and 738 which are respectively arranged to receive outputs from sensors 105 and 106, corresponding to those described with reference to the earlier embodiments. The digital outputs of the analog-to-digital converters 736 and 738 are coupled via a databus 740 to the microprocessor 734.

Figure 10:
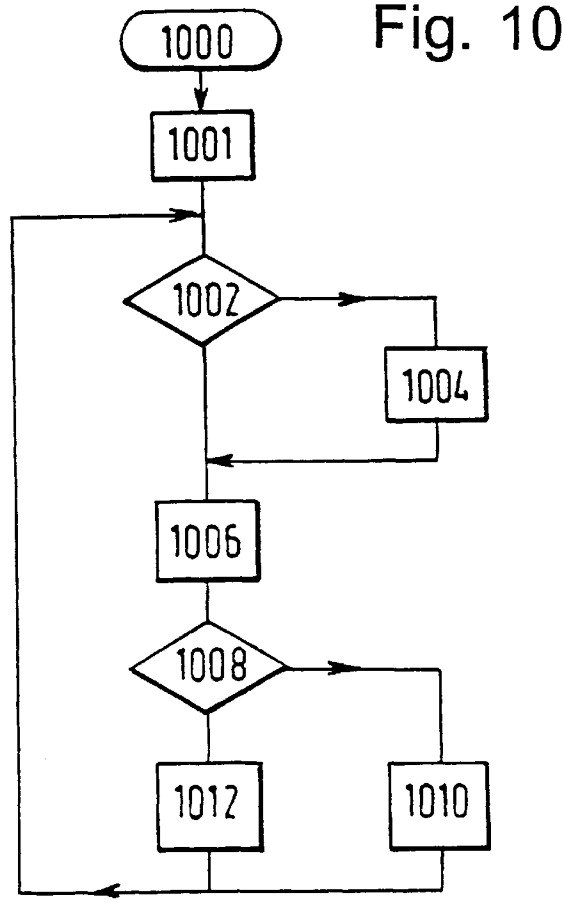
FIG. 10 is a main flowchart illustrating the operation of the third embodiment.

Referring to FIG. 10, when the apparatus is powered-up, the program stored in the ROM of the microprocessor 734 starts at step 1000. After the apparatus is powered up, during step 1001, there is a delay period while the light source stabilises and during which the LED 710 is steadily illuminated to produce a red light. The light is switched off and the program then proceeds to step 1002. The apparatus then determines whether either of the pushbuttons 716 and 730 has been operated. If either switch is operated, appropriate action is taken at step 1004. If the pushbutton 716 has been operated, the current setting for the audio volume, as stored in a RAM location, is altered. Successive operations of the switch thus step through successive different volume modes. The pushbutton 730 is a currency-selection switch. This embodiment is capable of operating with any one of three different currencies (e.g. English, Scottish and Irish). Although the apparatus is not intended to discriminate between different denominations of a currency, the paper, ink and printing processes used for different denominations within a particular currency often have sufficiently similar characteristics that the same apparatus can determine authenticity for a plurality of denominations, so long as they are associated with a single currency. In this embodiment, the selectable currencies are indicated by indicia 724, 726 and 728, and operation of the pushbutton 730 causes the associated LEDs 718, 720 and 722 to light in succession. Accordingly, the operator merely presses the pushbutton 730 until the LED associated with his selected currency is illuminated.

The volume and currency settings may then be stored in a non-volatile memory (not shown) so that they are correct upon power-up.

At step 1006, the processor 734 causes the analog-to-digital converter 736 to read the output of the sensor 105. This is compared with a previously-stored value representing a measurement when no banknote is present. The amount by which the present measurement exceeds the previously-stored measurement is calculated. (Instead of taking the difference between the present and the previously-stored measurement, the program may calculate a ratio.) At step 1008, if this amount exceeds a predetermined threshold, then it is assumed that a banknote is present, and the program proceeds to carry out an authentication operation indicated at step 1010 and shown in more detail in FIG. 11. Otherwise, the program proceeds to step 1012, where the previously-stored measurement is replaced by the current measurement. The program then loops back to step 1002.

Figure 11:
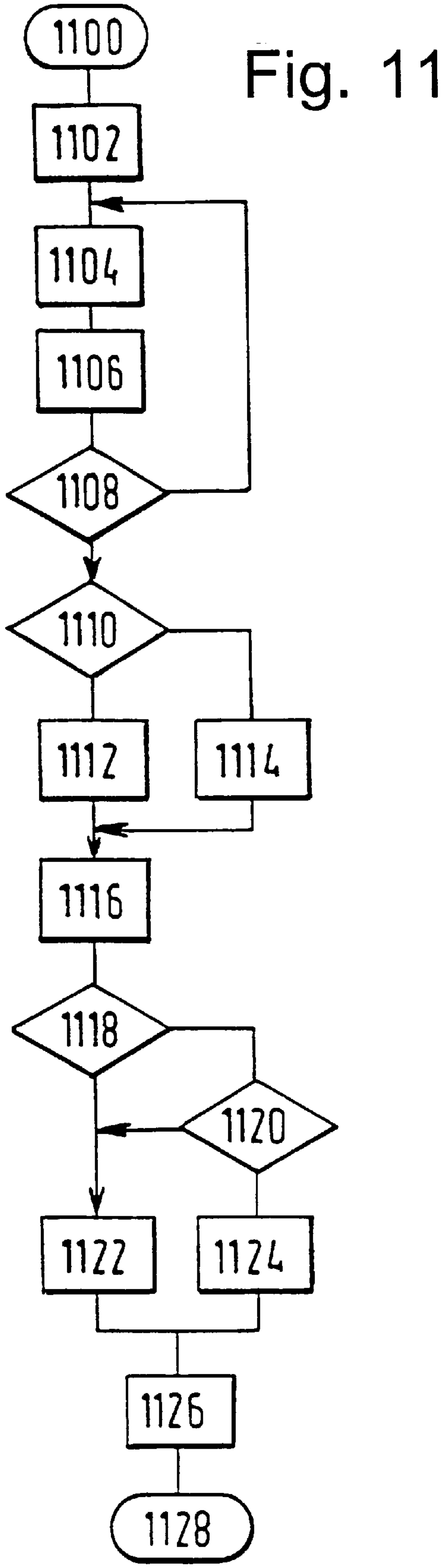
FIG. 11 is a flowchart showing the authentication routine performed by the third embodiment.

The authentication operation is shown in more detail at FIG. 11, and starts at step 1100. This step is reached as soon as a user inserts a banknote. This would be done by swiping the note from left to right, as in the second embodiment, or by inserting the note toward the rear, to a reference surface, and withdrawing it from the front.

First, at step 1102, the program waits for a predetermined delay time. This may be for example around 20 mS, to allow time for the banknote to be fully inserted. A counter N is then set to zero, and the program proceeds to step 1104. Here, the program causes both the converter 736 and 738 to operate to take measurements from the respective sensors 105 and 106. The program then proceeds to step 1106, where the program waits for a brief delay period and then increments the counter N. At step 1108, the program checks to see whether the counter N has reached 15, and if not the program loops back to steps 1104 and 1106. In this manner, 15 successive reflectivity measurements and 15 successive fluorescence measurements are made. (The value 15 is preferably a variable which is alterable depending on, e.g. the range of countries in which the apparatus is to be used.) At step 1110, the program checks the data associated with the selected currency. This data, which is stored in ROM, includes a measurement technique value, and four threshold values to be described below. The measurement technique value determines how the 15 measurements for each of reflectivity and fluorescence are to be processed. Depending upon the measurement technique value, the program will proceed either to step 1112, or to step 1114. At step 1112, the highest of the reflectivity values and the highest of the fluorescence values are taken, and the rest are discarded. At step 1114, the reflectivity values are averaged, and the fluorescence values are averaged. It has been found that either of these two techniques might be the more reliable, depending upon the currency in question. The program proceeds then to step 1116. Here, the program will have a single value representing measured fluorescence intended to be representative of the banknote as a whole, and a single value representing measured reflectivity. The program calculates the ratio of those values to the respective previously-stored values. These two ratios are used as the final reflectivity and fluorescence measurements.

The above technique, which involves taking a plurality of readings and then performing a process to derive a single measurement, is preferred, because it makes the apparatus even less sensitive to position of the banknote. It also slightly increases the effective area of the banknote over which readings are taken.

At step 1118, the program compares the final reflectivity measurement with two of the threshold values mentioned above, associated with the selected currency. These are upper and lower thresholds, and the program proceeds to step 1120 only if the reflectivity measurement lies between these thresholds. Otherwise, the program proceeds to a step 1122, where the user is given an indication that the note has not been authenticated. For example, the LED 710 is caused to flash red twice, and the speaker 714 is caused to emit a loud alarm noise.

At step 1120, the program checks the fluorescence measurement against the other two thresholds associated with the selected currency, which represents upper and lower permissible fluorescence limits. If the fluorescent measurement lies between these limits, the program proceeds to step 1124, but otherwise the program proceeds to step 1122. If the program reaches step 1124, this means that the banknote has passed the authenticity test, and the LED 710 is caused to flash green once, and a short and audibly-distinct confirmation noise is emitted by the speaker 714.

After step 1122 or step 1124, the program proceeds to step 1126, wherein the reflectivity level is repeatedly measured by operating the analog-to-digital converter 736 until it declines to the threshold level mentioned above. There is then a short delay period to allow sufficient time for the banknote to have been completely removed, following which the authenticity routine finishes at step 1128.

In this embodiment, the final fluorescence measurement is based on both the currently-detected level of fluorescence, and a previously-stored reading which was taken when no banknote was present. To ensure that there is a sufficient level to obtain a reliable reading of fluorescence when no banknote is present, preferably the apparatus is provided with fluorescent material (not shown) which is sufficient to cause a measurable signal to be generated in the absence of a banknote. This material can be positioned within the lower section 702 of the housing, possibly on the underside of the window (in which case it needs to be small so as not to obscure a banknote inserted into the apparatus) or adjacent the window. A reference level generated predominantly in response to reflection from this fluorescent material is more stable.

In an alternative embodiment, the currency data can cause either averaging, or peak detection, or both, to be performed; in the latter situation there are derived two values for reflectivity (and/or fluorescence), each derived from the same readings and each representative of the banknote as a whole.

The above embodiment could also be modified by arranging for the processor to examine the differences between the measurements for reflectivity (and/or the measurements for fluorescence). The arrangement could be such that a banknote is rejected unless reflectivity (and/or fluorescence) measurements exhibit deviations exceeding a particular threshold. This operation may also be performed in dependence on the data associated with the selected currency. This would avoid erroneously accepting counterfeits which exhibit overall the correct reflectivity and fluorescence characteristics, but which did not show the spatial variations expected of a genuine banknote.

In operation of the apparatus, the LED 710 has a number of states. A continuous red illumination indicates that the apparatus is warming up. No illumination indicates that the apparatus is ready to receive a banknote. A short green pulse indicates that the apparatus has completed its authentication and found the bill to be valid, and two red pulses indicates that authentication has been completed and the bill has been found to be a counterfeit. The apparatus is ready for use substantially instantaneously after the good/bad indication is given, so no further indication state is needed.

To a near approximation the following relationship applies:

$$r_s=(Ps/Pr)*r_g/(l-r_g)^2$$

where Ps is the reflected portion of the irradiating signal from the specimen, Pr is similarly that portion returned from the glass plate to be used as a reference, and $r_s$ and $r_g$ are the coefficients of reflectance from the specimen and the glass plate. It will be noted that the effect of variation in $r_g$ is negligible if small and significant if $r_g$ is allowed to become large. Also that the relationship is inherently non linear and has been simplified to a first approximation. More precise normalisation could be carried out if required.

It has been observed that UV reflection from a banknote varies with the degree of soiling. It may be possible to measure the degree of soiling (e.g. by using an infra-red source and measuring the amount of radiation transmitted through the note) and to compensate by adjusting the reference values stored accordingly. Preferably at least most of the infra-red light path is the same as that of the UV radiation so that the response is also sensitive to soiling in other areas, e.g. on the glass plate. There could be a manual switch which is operated when the user sees that a note is soiled to alter one or both reference values.

Additionally, or alternatively, the apparatus could be arranged to take a third measurement, of infra-red reflectivity (or transmissivity) , and use the results in a similar way to UV reflectivity and fluorescence to determine authenticity. To be deemed authentic, the banknote would have to then pass all three tests.

The signal indicating a counterfeit note could be applied to a timer which produces a pulse of, for example, approximately one second which actuates an audible and/or a visual alarm. The output pulse from the timer may also or alternatively be applied to a line driver which is adapted to provide a suitable signal for application to a management system. This management system may be used to provide a warning to a remote control position, such ass a manager's or security office in a shop for example, that a counterfeit note has been identified. Thus, as an alternative or in addition to the warnings at the point of sale (ie the till), management or security is discreetly informed. The line driver may, in one example, provide TTL signals.

It may be useful to be able to monitor the output of the lamp directly so that lamp degradation can be noted and thus the lamp replaced in good time. This may be achieved by applying the output from the sensor 105 (or another sensor receiving radiation from the source 104 irrespective of the presence of a banknote) to an input of a comparator. Another input of the comparator would receive a suitable threshold value. If the signal from the sensor becomes less than this threshold value then a signal is output from comparator to a warning means (e.g. audible and/or visual) to warn the operator to replace the lamp or one of its components.

Instead of making only one measurement of fluorescence it would be possible to make a plurality of measurements at different wavelengths using, e.g. different optical filters, and to base the determination of genuineness on the relative distributions.

In the above embodiments the measurements of reflectivity and fluorescence are separately processed to determine whether each is appropriate for a genuine banknote. Instead, the measurements could be combined (e.g. by multiplication or division), preferably after pre-processing at least one of them, and the result then tested to determine whether it is appropriate for a genuine note. For example, the difference between each measurement and a mean obtained by measuring a plurality of genuine notes may be squared, and the squares summed to obtain an overall measurement of the note.

Although it is preferred that the measured fluorescence be generated by the same UV source as is used for measuring reflectivity, a different source may alternatively be used.

It would be possible to modify the above-described embodiments so that only one sensor is used, e.g. by making the measurements in succession and switching filters.

The apparatus of the present invention may be embodied in a banknote counting machine for automatically counting notes in a stack and providing an alarm indication if a counterfeit note is detected. The apparatus may also be embodied in a safe box system provided with means for conveying notes to a safe, and testing each note before deposit. Alternatively, the apparatus could be attached to the side of a cash till.

Simpler, and less preferred embodiments will be described with refrence to FIGS. 11 to 17.

Figure 12:
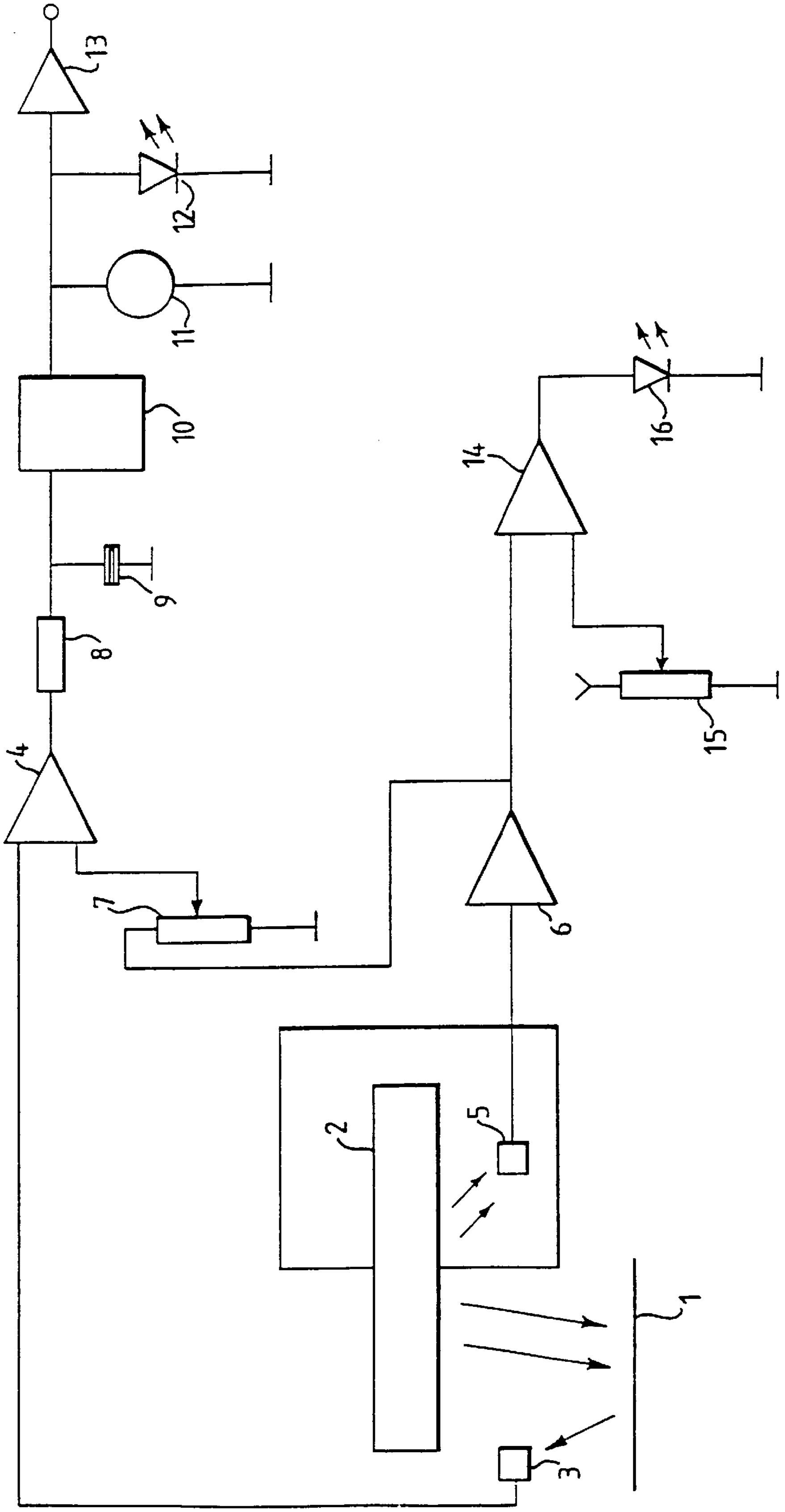
FIG. 12 is a block diagram of a further embodiment of a counterfeit detection apparatus.

FIG. 12 shows the circuit of an embodiment which measures both fluorescent light and reflected light using a single monitor to determine whether a bank note is counterfeit or genuine.

The apparatus comprises an ultraviolet (UV) lamp 2 which is preferably mounted in a hand-held scanning unit. The UV lamp 2 is arranged to emit radiation at a frequency which is known to cause bleached paper to fluoresce.

A detector 3 is arranged to receive both fluorescent and reflected radiation from a bank note 1 but not directly from UV lamp 2 without being reflected. The monitor may be a photo-diode or phototransistor, for example, sensitive to the appropriate light frequency or frequencies. In particular the monitor should be sensitive to fluorescent light in the 400–500 nm range and to reflected ultraviolet light in the 300–400 nm range so as to be sensitive to counterfeit notes of bleached paper which fluoresce or counterfeit notes which don't fluoresce but because they are counterfeit they often have a higher reflectance to ultraviolet light than genuine notes. An electrical signal is applied from monitor 3 to one input of a comparator 4.

A second detector or monitor 5 is arranged to receive UV radiation directly from lamp 2. The signal from this is first amplified by an amplifier 6 and applied to a resistor 7 the other end of which is earthed. Thus, the voltage across the resistor 7 is proportional to the intensity of the radiation emitted by the lamp. Resistor 7 forms part of a potentiometer, the slider connection of which itself is applied as a second input to comparator 4. The slider can be set to provide a threshold value representing a predetermined proportion of the voltage which is proportional to the UV intensity.

The comparator 4 is arranged to output a signal if the signal received by the monitor 3 is greater than or equal to the set detection threshold. When the threshold is reached it means that a certain proportion of the light impinging upon note 1 has been reflected or re-emitted as fluorescence and therefore it is assumed that the note is counterfeit.

The signal from the comparator 4 is applied through a low pass filter (for example an RC filter 8,9 as shown in FIG. 12) to a timer 10. This timer produces a pulse of, for example, approximately one second which actuates a buzzer 11 and a visual alarm in the form of an LED 12. In the example shown buzzer 11 and LED 12 are mounted in parallel between an output line from timer 10 and ground. Other types of alarm, whether audible or visual or both can be used in addition or as an alternative to those shown. The output pulse from timer 10 may also be applied to a line driver 13 which is adapted to provide a suitable signal for application to a management system. This management system may be used to provide a warning to a remote control position, such as a manager's or security office in a shop for example, that a counterfeit note has been identified. Thus, as an alternative or in addition to the warnings at the point of sale (ie the till) management or security is discretely informed. The line driver may, in one example, provide TTL signals.

It is useful to be able to monitor the output of the lamp directly so that lamp degradation can be noted and thus the lamp replaced in good time. This is achieved in the example shown in FIG. 6 by applying the output from amplifier 6 to a first input of a second comparator 14. The other input of comparator 14 is taken from a potentiometer 15 which is used to set a low threshold value for the voltage monitored by lamp monitor 5 and which is therefore proportional to the UV intensity of lamp 2. If the signal from amplifier 6 is less than this low threshold value then a signal is output from comparator 14 to a warning means such as a second LED 16 forming a lamp level low indicator. When this LED lights then the operator is warned to replace the lamp or one of its components.

Figure 13:
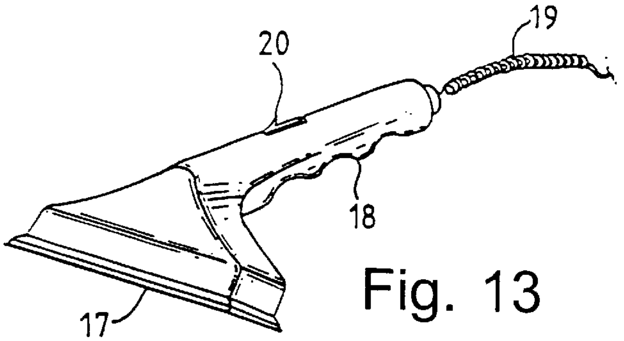
FIG. 13 is a perspective view of a further embodiment in the form of a hand-held scanning unit.
Figure 14:
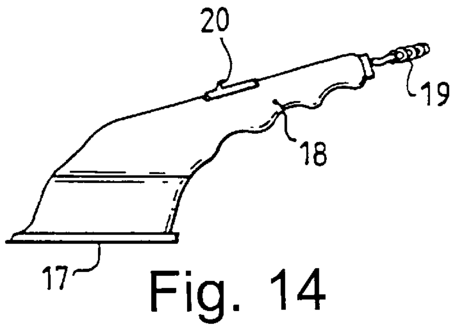
FIG. 14 is a side view of the hand-held unit.
Figure 15:
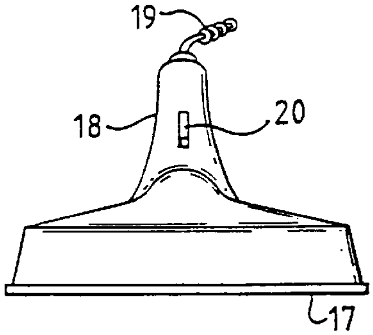
FIG. 15 is a front view of the hand-held unit.

The apparatus is may be configured as a hand-held scanning unit and one, non-limiting example of a suitable housing in which the apparatus may be mounted is shown in FIGS. 13 to 15. The unit comprises a head 17 in which the UV lamp 2 is mounted to illuminate an object placed underneath the head. A handle 18 is preferably shaped with a series of ridges for example to facilitate a good hand grip. Power for the apparatus is provided through a mains lead 19 which can be from a mains supply, from an adjacent till or EPOS unit, or by other means. It may alternatively be possible for the apparatus to be powered by batteries, which may be rechargeable batteries, for true portability. A basic on/off switch 20 is provided which enables lamp 2 to be illuminated and therefore the detection apparatus to function only when the switch is depressed by a thumb for example when the unit is being held. If this configuration is adopted then the unit is arranged to operate only in the scan position. In one embodiment, the signal to a remote control or monitoring station, such as a security office, may be transmitted by mains-born signalling. This may be achieved by applying pulses of known frequency onto the mains. If different frequencies are applied by different units then an operator at the remote position, when receiving a signal indicating a counterfeit note, will know which scanning unit has identified that note.

The unit may be temporarily mounted in position, eg by a suitable bracket mounting, when in use and/or when 'dormant'. The portable and adaptable nature of the unit enables great versatility of use in different environments and situations and with different attachments thereto.

It should be noted that the detection circuitry is effectively only operated when the ON/OFF switch is used to actuate the lamp, thereby minimising power consumption and reducing false readings from objects other than those desired to be tested.

Figure 16:
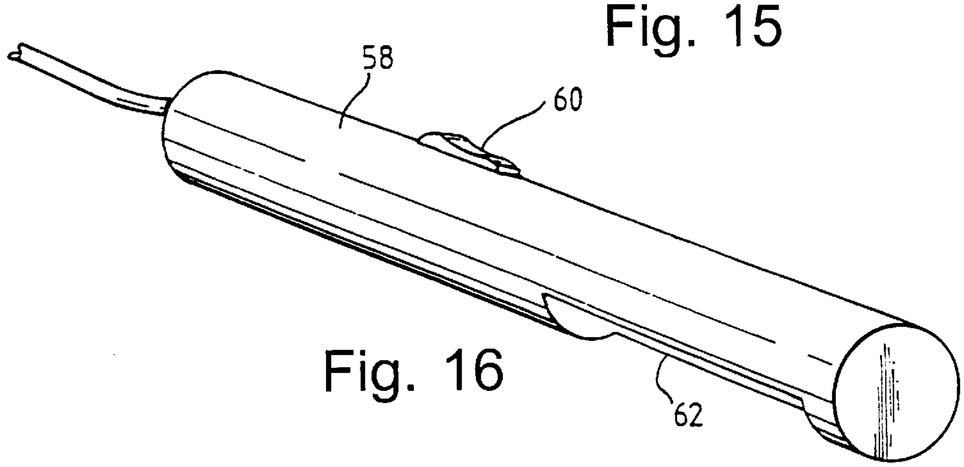
FIG. 16 is a perspective view of another form of hand-held unit.
Figure 17:
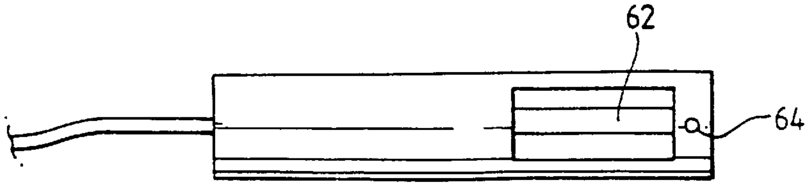
FIG. 17 is an under plan view of the unit of FIG. 16.

An alternative hand-held scanning unit in the form of a wand is shown in FIGS. 16 and 17. As shown, the wand has a cylindrical housing 58 having a switch 60 on one side and an ultraviolet lamp 62 on the opposite side. A sensor 64 is located adjacent the lamp 62. The unit operates in a similar manner to the unit of FIGS. 13 to 15.

The counterfeit objects may be other than bank notes and could be any object, the authenticity of which relies to some extent on the type of paper or other material it is formed from or printed on. In some examples the genuine article may glow under UV light, in which case the apparatus can be suitably modified, eg by reversing the input connections to comparator 4 so that a signal less than a threshold level actuates an alarm.

We claim:

1. Apparatus for detecting counterfeit objects by using both ultraviolet reflectivity and fluorescence of the object to determine the genuineness of the object material, the apparatus comprising:

means for illuminating a test object with ultraviolet light;

detector means for detecting (i) reflected light from the test object having a first wavelength within a first wavelength band, (ii) fluorescent light from the test object having a second wavelength within a second wavelength band different from said first wavelength band, the second wavelength band including wavelengths at which counterfeit objects may fluoresce when exposed to said ultraviolet light, and (iii) a reference light level from the illuminating means, wherein the detector means is operable to provide a measurement output dependent upon the detected reflected light and the detected fluorescent light; and decision means for deciding whether the test object is counterfeit or not and providing an appropriate indication, the decision means being responsive to the detected reflected light and to the detected fluorescent light and including comparison means for performing a comparison of the measurement output with the detected reference light level;

wherein the detector means is arranged such that the reference light level is substantially unaffected by the presence of the test object.

2. Apparatus according to claim 1 including a transparent plate for supporting a said object on one side thereof with the detector means being located on the other side thereof and directed at the object through said plate.

3. Apparatus according to claim 2 wherein said detector means comprises first and second photocells each positioned to receive light from a said object and respectively arranged to be sensitive to light only in said first wavelength band and light only in said second wavelength band.

4. Apparatus according to claim 3, wherein the optical axes of the photocells and the illuminating means converge upon that surface of the plate which is arranged to support a said object.

5. Apparatus according to claim 1 including shielding means for shielding said detector means from ambient light.

6. Apparatus according to claim 1, including currency selecting means for switching said apparatus into different currency modes, whereby the criteria by which said first and second signals are treated as representing a counterfeit banknote are altered.

7. Apparatus according to claim 1, wherein said decision means comprises indication means for providing a first indication when the object is a counterfeit banknote and a second indication when the object is a genuine banknote.

8. Apparatus according to claim 7, wherein said indication means is operable to provide a third indication when the apparatus is ready to receive and test a said object.

9. Apparatus claimed in claim 1, wherein the detector means is operable to detect radiation from an illuminated area of the sheet of at least 6 $cm^2$.

10. Apparatus according to claim 1, wherein said second wavelength band width is within the range 400 to 500 nm.

11. Apparatus according to claim 1, wherein said detector means is operable to provide separate. signals indicative respectively of the level of reflected ultraviolet light and of the level of fluorescent light.

12. Apparatus according to claim 11, wherein the comparison means is operable to perform said comparison by comparing the reflected ultraviolet light signal with the detected reference light level.

13. Apparatus according to claim 11, wherein said detector means comprises first and second photocells each positioned to receive light from said test object respectively through a first optical filter only passing light in said first wavelength band and through a second optical filter only passing light in said second wavelength band.

14. Apparatus according to claim 13, wherein the detector means is operable to provide a signal representing the reference light level in response to the output of the first photocell in the absence of a test object.

15. Apparatus according to claim 14, further including a glass plate for supporting said test object on one side thereof, with the illumination means and the detector means being located on the other side thereof and directed at the test object through said glass plate; and reference means for storing a first reference level which is a function of the light reflected by the glass plate in the absence of an object thereon and received by the first photocell.

16. Apparatus according to claim 13, further including a glass plate for supporting said test object on one side thereof, with the illumination means and the detector means being located on the other side thereof and directed at the test object through said glass plate, wherein the optical axes of the photocells and the illuminated means converge upon that surface of the glass plate which is arranged to support said test object.

17. Apparatus according to claim 1, further including a glass plate for supporting said test object on one side thereof, with the illumination means and the detector means being located on the other side thereof and directed at the test object through said glass plate.

18. Apparatus according to claim 1, further including means responsive to the detector means to provide a record of the magnitude of the received signals having wavelengths in said first and second bands.

19. Apparatus according to claim 1, wherein said decision means comprises means for providing a first indication when the test object is counterfeit and for providing a second, different indication when the test object is genuine.

20. Apparatus according to claim 1 is operable to provide a single signal representative of the combination of the reflected ultraviolet light and the fluorescent light, and wherein said comparison means is operable to compare said signal with a signal representative of the detected reference light level.

21. Apparatus according to claim 20, wherein said detector means comprises a first sensor for detecting reflected ultraviolet light and fluorescent light and a second sensor for detecting the reference light level.

22. Apparatus as claimed in claim 1, wherein the apparatus is operable to detect counterfeit banknotes.

23. Apparatus according to claim 1, further including shielding means for shielding said detector means from ambient light.

24. Apparatus as claimed in claim 23, wherein the apparatus is operable to detect counterfeit banknotes and wherein the shielding means is a cover which provides a slot through which a banknote can be inserted onto a window through which said ultraviolet light passes.

25. Apparatus for detecting counterfeit objects including a transparent plate for supporting an object, comprising:

means for illuminating a test object with ultraviolet light;

detector means directed at the object through the plate for detecting (i) reflected light from the test object having a first wavelength within a first wavelength band, (ii) fluorescent light from the test object having a second wavelength within a second wavelength band different from said first wavelength band, the second wavelength band including wavelengths at which counterfeit objects may fluoresce when exposed to said ultraviolet light, and (iii) a reference light level from the illuminating means, wherein the detector means is operable to provide a measurement output dependent upon the detected reflected light and the detected fluorescent light;

wherein the detector means comprises first and second photocells each positioned to receive light from a said object and respectively arranged to be sensitive to light only in said first wavelength band and light only in said second wavelength band;

decision means for deciding whether the test object is counterfeit or not and providing an appropriate indication, the decision means being responsive to the detected reflected light and to the detected fluorescent light and including comparison means for performing a comparison of the measurement output with the detected reference light level; and reference means for storing a first reference level which is a function of the light reflected by the plate in the absence of an object thereon and received by the first photocell, the decision means using the reference level in deciding whether the said object is a genuine banknote, wherein the detector means is arranged such that the reference light level is substantially unaffected by the presence of the test object.

26. Apparatus for detecting counterfeit objects, comprising:

means for illuminating a test object with ultraviolet light;

detector means for detecting (i) reflected light from the test object having a first wavelength within a first wavelength band, (ii) fluorescent light from the test object having a second wavelength within a second wavelength band different from said first wavelength band, the second wavelength band including wavelengths at which counterfeit objects may fluoresce when exposed to said ultraviolet light, and (iii) a reference light level from the illuminating means, wherein the detector means is operable to provide a measurement output dependent upon the detected reflected light and the detected fluorescent light;

control means for taking a plurality of readings of reflectivity of a banknote and a plurality of readings of fluorescence of the banknote, and for processing the readings to obtain a single reflectivity measurement and a single fluorescence measurement; and decision means for deciding whether the test object is counterfeit or not and providing an appropriate indication, the decision means being responsive to the reflectivity measurement and to the fluorescent measurement and including comparison means for performing a comparison with the detected reference light level;

wherein the detector means is arranged such that the reference light level is substantially unaffected by the presence of the test object.

27. Apparatus according to claim 26, including means for selecting between first and second processing modes, in which the plurality of reflectivity readings and/or the plurality of fluorescence readings are processed in different ways.

28. Apparatus according to claim 27, including currency selecting means for switching said apparatus into different currency modes, whereby the criteria by which said first and second signals are treated as representing a counterfeit banknote are altered, said processing mode selection means selecting the processing mode on the basis of the selected currency.

29. A method of detecting counterfeit banknotes by using both the ultraviolet reflectivity and fluorescence of the banknote to determine the genuineness of the banknote paper, comprising:

manually transporting a sheet past a source of ultraviolet radiation, taking a plurality of readings of reflected ultraviolet radiation and a plurality of readings of fluorescence as the sheet passes the source, processing the readings so as to obtain a first signal representative of the ultraviolet reflectivity of the sheet and a second signal indicative of the fluorescence of the sheet, and providing a signal indicating that the sheet is a genuine banknote if the first and second signals meet predetermined criteria.

30. A method for detecting counterfeit documents by using both the ultraviolet reflectivity and fluorescence of the document to determine the genuineness of the document material, comprising:

operating an ultraviolet light source;

manually transporting a test item past the ultraviolet light source so as to illuminate the test item;

detecting light of a first wavelength with a detection means;

generating a first signal indicative of the reflectivity of the test item;

detecting light of a second wavelength with a detection means;

generating a second signal indicative of the fluorescence of the test item;

generating a third signal indicative of the intensity of the ultraviolet light source in the absence of the test item; and deciding whether the test item is genuine based on the first, second and third signals.

31. The method of claim 30, further comprising: providing a visual indication if the test item is genuine.

32. The method of claim 30 or 31, further comprising:

providing a visual indication if the test item is counterfeit.

33. The method of claim 30 or 31, further comprising:

providing an audio indication if the test item is counterfeit.

34. The method of claim 30 further comprising:

providing an audio indication if the test item is genuine.

35. The method of claim 30, wherein each of said first and second signals represents characteristics of the document.

36. The method of claim 30, further comprising:

generating a light source signal corresponding to the intensity of the output of the light source;

comparing the light source signal to a threshold value; and activating a warning means if the light source signal is below the threshold value.

37. The method of claim 30, further comprising: modulating the light source at a selected frequency; and demodulating the detection means at the same frequency to reduce the effects of ambient light.

38. The method of claim 30, wherein a plurality of measurements of fluorescence are taken for each test item.

39. A method for detecting counterfeit documents wherein the test item is illuminated through a transparent glass plate, comprising:

operating an ultraviolet light source;

manually transporting a test item past the ultraviolet light source so as to illuminate the test item;

detecting light of a first wavelength with a detection means;

generating a first signal indicative of the reflectivity of the test item;

detecting light of a second wavelength with a detection means;

generating a second signal indicative of the fluorescence of the test item;

generating a third signal indicative of the intensity of the ultraviolet light source from the light reflected from the glass plate when no test item is present for comparison with the degree of reflection of a test item; and deciding whether the test item is genuine based on the first, second and third signals.

40. The method of claim 39, wherein the step of deciding whether the test item is genuine comprises:

comparing the first signal to a first range of acceptable values;

comparing the second signal to a second range of acceptable values; and accepting the test item as genuine if the first and second signals fall within the first and second ranges.

41. The method of claim 40, wherein the first range corresponds to relatively low levels of fluorescence.

42. The method of claim 40, wherein the second range corresponds to relatively low levels of reflectivity.

43. The method of claim 40, further comprising:

adjusting the first and second ranges to approximately track the actual measured first and second signal values of test items determined to be genuine.

44. An apparatus for validating banknotes which contains no moving parts, comprising:

a housing;

a transparent window connected to one side of the housing and past which a banknote can be manually transported;

a light source contained within the housing;

at least one light detection means in the housing for sensing reflected light from the banknote falling within a first wavelength band and producing a first signal, for sensing the fluorescent light emanating from the banknote falling with a second wavelength band and producing a second signal, and for sensing light from the light source in the absence of a banknote in order to produce a third signal;

decision means connected to the light detection means for deciding, based on the first, second and third signals, whether the banknote is genuine; and indicator means for indicating that the banknote is genuine.

45. The apparatus of claim 44, wherein the indicator means is operable also for indicating that the banknote is counterfeit.

46. The apparatus of claim 44 or 45, wherein the indicator means is operable also for indicating that the apparatus is ready to validate another banknote.

47. The apparatus of claim 44, further comprising:

a substantially rectangular shield connected to the housing which lies in a plane over the transparent window, wherein the shield blocks ambient light from falling on the window and forms a channel with the window through which banknotes pass.

48. The apparatus of claim 47, wherein at least one edge of the shield is rounded to enlarge the opening leading to the channel.

49. The apparatus of claim 47, wherein the shield is connected to the housing on one side such that a user may grasp a banknote during the entire validation process.

50. The apparatus of claim 44, wherein the light source is modulated at a selected frequency and the output of the light detection means is demodulated at the same frequency to reduce the effects of ambient light.

51. The apparatus of claim 44, further comprising:

a warning indicator for signalling that the light source has degraded.

52. A method for determining the genuineness of a test object using counterfeit detection apparatus, the method comprising the steps of illuminating the test object with ultraviolet light and determining the genuineness on the basis of the detected fluorescence of the test object and the ultraviolet light reflected therefrom, wherein the testing operation initially involves the manual positioning of the detection apparatus and test object relative to each other, and wherein the genuineness decision uses an ultraviolet reflective measurement having a magnitude which is determined by the absolute reflectivity of the test object and not by the relationship between reflectivity in different areas thereof.

53. A method as claimed in claim 52 for detecting the genuineness of banknotes.

54. Apparatus for detecting counterfeit objects by using both the ultraviolet reflectivity and fluorescence of the object to determine the genuineness of the object material, the apparatus comprising:

means for illuminating a test object with ultraviolet light; detector means for detecting (i) reflected light from said test object having a first wavelength within a first wavelength band, (ii) fluorescent light from said test object having a second wavelength within a second wavelength band different from said first wavelength band, said second wavelength band including wavelengths at which counterfeit objects may fluoresce when exposed to said ultraviolet light, and (iii) a reference light level from the illuminating means, wherein the detector means is operable to provide a measurement output dependent upon the detected reflected light and the detected fluorescent light; and decision means for deciding whether said object is counterfeit or not and providing an appropriate indication, wherein the decision means is responsive to the detected reflected light and the detected fluorescent light and includes comparison means for performing a comparison of the measurement output with the detected reference light level;

wherein the detector means is arranged such that the reference light level is representative of and varies substantially only with the intensity of the ultraviolet light emitted by the illuminating means.

55. A method for checking for counterfeit banknotes using the ultraviolet reflectivity and fluorescence of the banknote to determine the genuineness of the banknote paper, comprising:

manually positioning a banknote relative to a light source and a detector means;

sensing the ultraviolet radiation emitted by the light source and reflected by the banknote and the fluorescent light emitted by the banknote; and providing an indication of genuineness in dependence upon the sensed ultraviolet radiation and fluorescent light.

* * * * *

UNITED STATES PATENT AND TRADEMARK OFFICE

CERTIFICATE OF CORRECTION

PATENT NO. : 5,918,960
DATED : July 6, 1999
INVENTOR(S) : John Hopwood et al.

It is certified that error appears in the above-identified patent and that said Letters Patent is hereby corrected as shown below:

Title page,
Item [63], Related U.S. Application Data, after "abandoned", please insert -- and a continuation-in-part of PCT/GB94/00006, filed January 4, 1994 --.

Column 11,
Line 14, please delete "ass" and insert -- as --.

Column 17, claim 35,
Line 33, after "document", please insert -- over a substantial area thereof --.

Signed and Sealed this

Fourth Day of December, 2001

*Attest:*

Nicholas P. Godici

NICHOLAS P. GODICI

*Attesting Officer* *Acting Director of the United States Patent and Trademark Office*